United States Patent
Miyata et al.

(10) Patent No.: US 11,470,258 B2
(45) Date of Patent: Oct. 11, 2022

(54) IMAGE PROCESSING APPARATUS AND IMAGE PROCESSING METHOD TO PERFORM IMAGE PROCESSING ON DIVIDED AREAS

(71) Applicant: Ricoh Company, Ltd., Tokyo (JP)

(72) Inventors: Masashi Miyata, Tokyo (JP); Masakazu Terauchi, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/154,036

(22) Filed: Jan. 21, 2021

(65) Prior Publication Data

US 2021/0289116 A1  Sep. 16, 2021

(30) Foreign Application Priority Data

Mar. 13, 2020  (JP) .............................. JP2020-044681

(51) Int. Cl.
*H04N 5/235* (2006.01)
*H04N 5/243* (2006.01)

(52) U.S. Cl.
CPC ........... *H04N 5/2351* (2013.01); *H04N 5/243* (2013.01)

(58) Field of Classification Search
CPC .. H04N 5/2351; H04N 5/243; H04N 5/23245; H04N 5/23229; H04N 5/23219
See application file for complete search history.

(56) References Cited

U.S. PATENT DOCUMENTS

| | | | |
|---|---|---|---|
| 8,212,890 B2 * | 7/2012 | Nomura | H04N 9/735 348/222.1 |
| 2004/0095478 A1 * | 5/2004 | Takano | H04N 5/772 386/E5.072 |
| 2010/0231746 A1 | 9/2010 | Nomura | |
| 2014/0139699 A1 * | 5/2014 | Yim | H04N 5/23222 348/222.1 |
| 2015/0116538 A1 | 4/2015 | Terauchi et al. | |
| 2016/0358338 A1 * | 12/2016 | Tsunoda | G06K 9/6267 |
| 2018/0150725 A1 * | 5/2018 | Tate | H04N 5/2353 |
| 2019/0045146 A1 | 2/2019 | Terauchi et al. | |
| 2019/0191082 A1 | 6/2019 | Uehara et al. | |
| 2019/0296062 A1 | 9/2019 | Terauchi et al. | |
| 2019/0297242 A1 | 9/2019 | Terauchi et al. | |

FOREIGN PATENT DOCUMENTS

JP  2010-213213  9/2010

* cited by examiner

*Primary Examiner* — Luong T Nguyen
(74) *Attorney, Agent, or Firm* — Xsensus LLP

(57) ABSTRACT

An image processing apparatus includes processing circuitry configured to: divide an input image into a plurality of areas to correspond to predetermined categories, using information of the image; set different image processing parameters for the divided areas corresponding to the predetermined categories, respectively; perform image processing on the divided areas using the image processing parameters corresponding to the divided areas; and combine the divided areas on which the image processing has been performed to form an image.

12 Claims, 7 Drawing Sheets

A AREA          B AREA

- ④ ← FACE DETECTION
- ③ ← AREA OF RECOGNIZED OBJECT
- ② ← FIRST AREA WITH LIGHT FROM LIGHT SOURCE IDENTIFIED BY WHITE BALANCE DETECTION
- ② ← SECOND AREA WITH LIGHT FROM LIGHT SOURCE IDENTIFIED BY WHITE BALANCE DETECTION
- ① ← BASE DETERMINED BASED ON IDENTIFIED SCENE

IMAGE PROCESSING APPARATUS AND IMAGE PROCESSING METHOD TO PERFORM IMAGE PROCESSING ON DIVIDED AREAS

CROSS-REFERENCE TO RELATED APPLICATIONS

This patent application is based on and claims priority pursuant to 35 U.S.C. § 119(a) to Japanese Patent Application No. 2020-044681, filed on Mar. 13, 2020, in the Japan Patent Office, the entire disclosure of which is hereby incorporated by reference herein.

BACKGROUND

Technical Field

Embodiments of the present disclosure relate to an image processing apparatus and an image processing method to perform image processing for each divided area.

Related Art

Conventionally, a method of estimating a light source and applying white balance to the entire capturing screen is known. When some irradiation areas are irradiated with light beams from different types of light sources, however, such a method of applying white balance to the entire capturing screen might cause color shift and fails to achieve proper white balance.

SUMMARY

In one aspect of this disclosure, there is described an image processing apparatus including processing circuitry configured to: divide an input image into a plurality of areas to correspond to predetermined categories, using information of the image; set different image processing parameters for the divided areas corresponding to the predetermined categories, respectively; perform image processing on the divided areas using the image processing parameters corresponding to the divided areas; and combine the divided areas on which the image processing has been performed to form an image.

In another aspect of this disclosure, there is disclosed an image processing method including: dividing an input image into a plurality of areas to correspond to predetermined categories, using information of the image; setting different image processing parameters for the divided areas corresponding to the predetermined categories, respectively; performing image processing on the divided areas using the image processing parameters corresponding to the divided areas; and combining the divided areas on which the image processing has been performed to form an image.

BRIEF DESCRIPTION OF THE SEVERAL VIEWS OF THE DRAWINGS

The aforementioned and other aspects, features, and advantages of the present disclosure would be better understood by reference to the following detailed description when considered in connection with the accompanying drawings, wherein.

Figure 1:
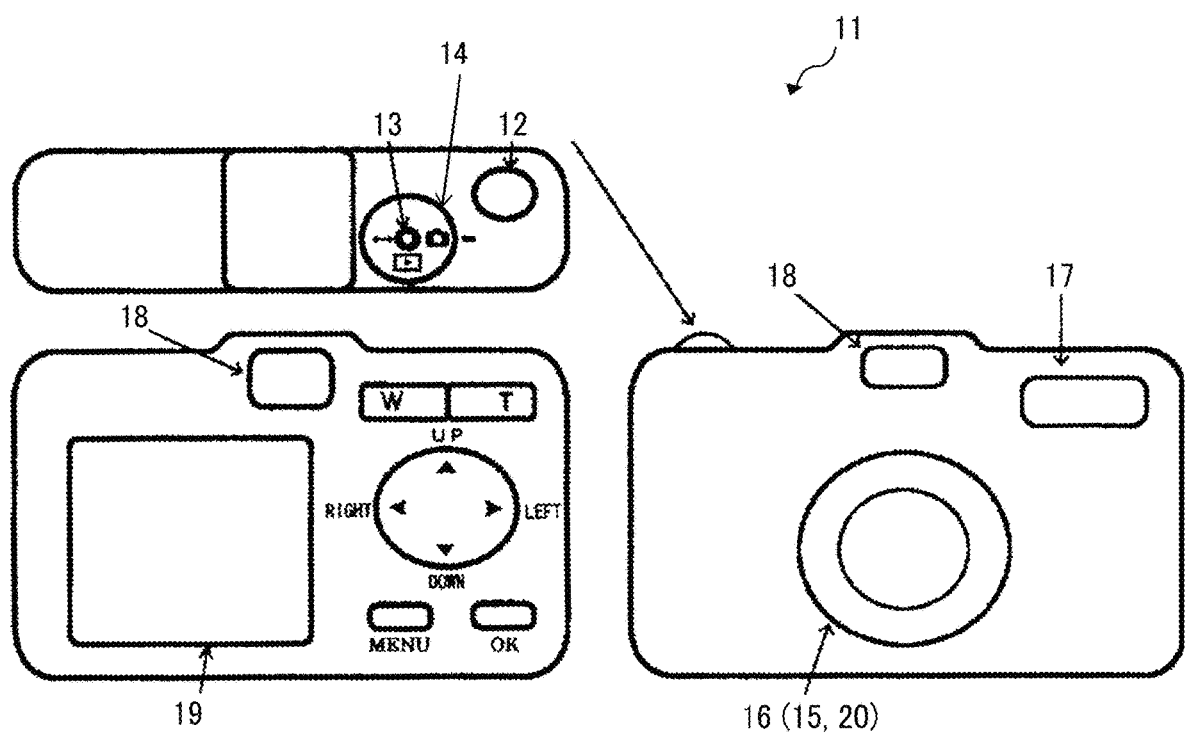
FIG. 1 is an illustration of a configuration of an image-capturing device according to an embodiment to the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

The embodiments of the present disclosure provide an image processing apparatus and an image processing method to perform image processing more suitable to achieve intended image quality and generate an image with the intended quality.

Figure 2:
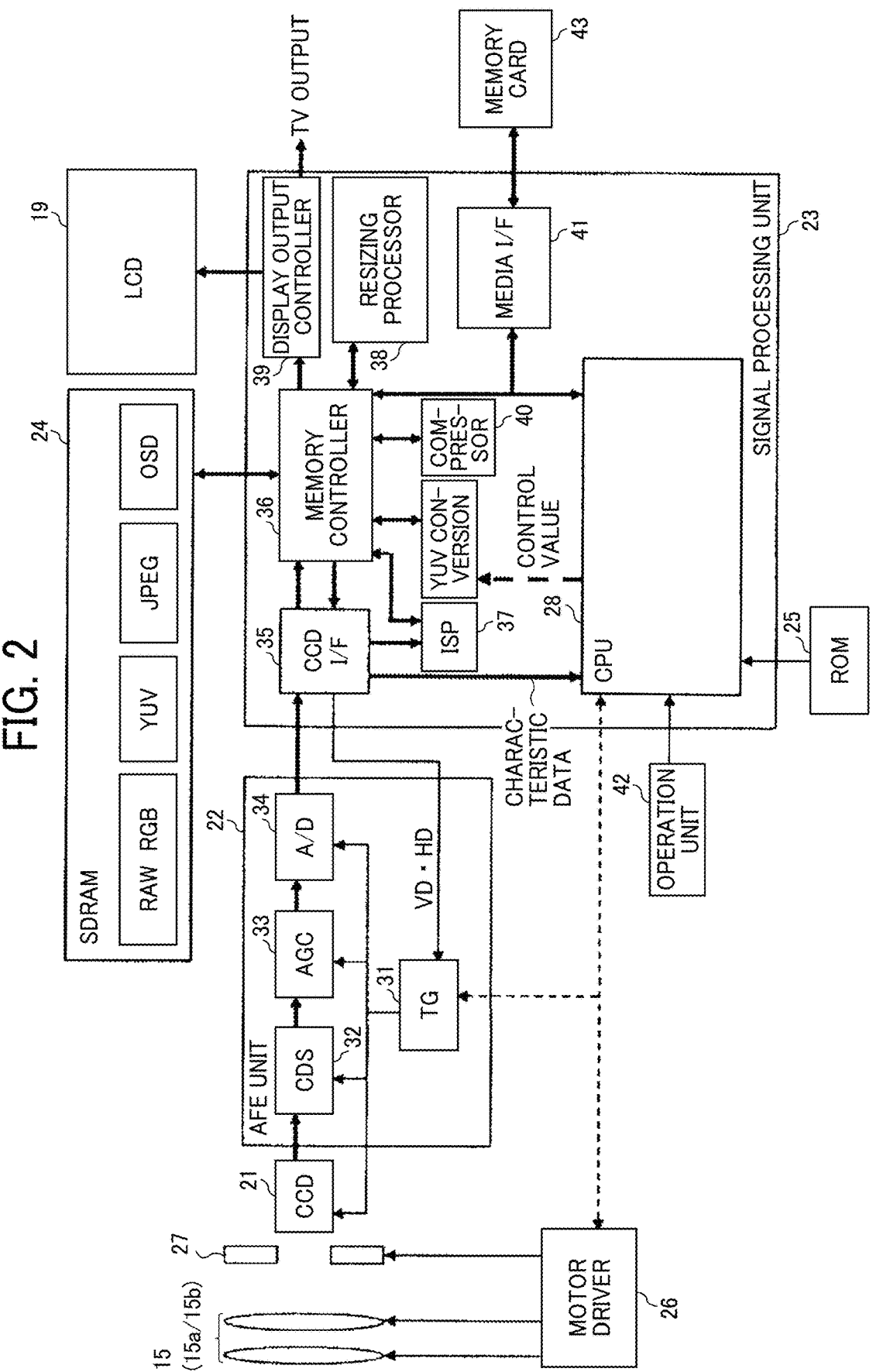
FIG. 2 is a block diagram of a configuration of the image-capturing device in FIG. 1.

An embodiment of the present disclosure is described below in detail referring to the drawings. FIG. 1 is an illustration of the appearance of an image-capturing device 11 (an image processing apparatus) as viewed from three perspectives, according to an embodiment. FIG. 2 is a block diagram of a configuration of the image-capturing device 11.

The image-capturing device 11 according to an embodiment is, for example, a digital camera. As illustrated in FIG. 1, the digital camera includes a release button 12 (shutter button), a power switch 13, and a shooting/replay switching dial 14 on the top surface. The digital camera further includes a lens barrel unit 16 including an image-capturing lens 15 (an optical system); a flash lump 17, and an optical viewfinder 18 on the front surface.

The digital camera further includes a liquid crystal display (LCD) 19, an ocular lens 20 of the optical viewfinder 18, a wide-angle side zoom (W) switch, a telephoto-side zoom (T) switch, a MENU key, a direction key (UP, DOWN, RIGHT, LEFT), and an OK key on the rear side. In addition, the digital camera further includes a memory card housing for housing a memory card that stores captured image data inside the side surface of the digital camera.

As illustrated in FIG. 2, the digital camera includes a charge coupled device (CCD) 21 serves as a solid-state image sensor to form, on a photo-sensing surface, an image of a subject captured through the image-capturing lens 15 (i.e., the optical system) in the lens barrel unit 16. The digital camera further includes an analog front end (AFE) unit 22, a signal processing unit 23, a synchronous dynamic random access memory (SDRAM) 24, a read only memory (ROM) 25, and a motor driver 26. The AFE unit 22 processes an electrical signal (i.e., an analog RGB (red, green, blue) image signal) output from the CCD 21, into a digital signal (i.e., an image-captured signal). The signal processing unit 23 processes the digital signal output from the AFE unit 22. The data is temporarily stored in the SDRAM 24. The ROM 25 stores control programs.

The lens barrel unit 16 includes the image-capturing lens 15 including a zoom lens 15a and a focus lens 15b; a stop unit, and a mechanical shutter unit 27. Each drive unit of the image-capturing lens 15, the stop unit, and the mechanical shutter unit 27 is controlled by the motor driver 26. The motor driver 26 is controlled by a drive signal output from a controller 28 (a central processing unit (CPU)) as a controller of the signal processing unit 23.

The CCD 21 includes a plurality of pixels and an RGB primary color filter as a color separation filter on the pixels, to output electrical signals (i.e., analog RGB image signals) corresponding to RGB three primary colors.

The AFE unit 22 includes a timing signal generator (TG) 31, a correlated double sampling (CDS) 32, an analog gain controller (AGC) 33, and an analog-digital (A/D) convertor 34. The TG 31 controls the CCD 21. The CDS 32 samples the electrical signals output from the CCD 21. The AGC 33 adjusts a gain of the image signal sampled by the CDS 32. The A/D convertor 34 converts the image signal whose gain has been adjusted by the AGC 33 into a digital signal (raw data).

The signal processing unit 23 includes a CCD interface (I/F) 35, an image signal processor (ISP) 37, a resizing processor 38, a display output controller 39, a data compressor 40, a media I/F 41, and the controller 28 (CPU). The CCD I/F 35 outputs a screen horizontal synchronizing signal (HD) and a screen vertical synchronizing signal (VD) to the TG 31 of the AFE unit 22, and captures raw data output from the A/D 34 of the AFE unit 22 in accordance with these synchronizing signals. The memory controller 36 controls the SDRAM 24, and the ISP 37 processes the captured raw data, and converts the data into various image formats or processes an image of the data. The resizing processor 38 changes an image size according to the size of image data to be displayed or recorded. The display output controller 39 controls display output of the image data. The data compressor 40 is used to record the image data compressed into, for example, the JPEG format. The media I/F 41 writes image data to a memory card 43 or reads image data written in the memory card 43. The controller 28 (CPU) controls, for example, the entire system of the digital camera in accordance with the control programs stored in the ROM 25, upon information input through the operation unit 42.

The operation unit 42 includes the release button 12, the power switch 13, the shooting/replay switching dial 14, the wide-angle side zoom (W) switch, the telephoto-side zoom (T) switch, the MENU key, the direction key, and the OK key on the external surface of the digital camera in FIG. 1. In accordance with a user (i.e., a photographer) operation, a given operation instruction signal is input to the controller 28.

In the SDRAM 24, the raw data captured by the CCD I/F 35 is stored. The captured raw data may be stored as image data in, for example, YUV format or YCC format in the SDRAM 24. Further, image data compressed in, for example, JPEG format by the data compressor 40 may be stored in the SDRAM 24. Further, an on-screen display (OSD) is image data displayed on the LCD 19, in which information including setting information of an operation system is superimposed on a captured image.

The ISP 37 processes an image of the captured raw data or image data in different forms. The ISP 37 specifically adjusts noise, white balance, matrix, chroma, gamma, tone curve, contrast, hue, sharpness, clearness, and texture, for example. These processes are performed in accordance with specified parameters. Such image processing involves converting data into an intended image format.

Next, a monitoring operation and a still-image capturing operation of the digital camera are described. The digital camera has a still-image capturing mode, and in the still-image capturing mode, the digital camera captures a still image while performing a monitoring operation as described below.

When the photographer turns on the power switch 13 and sets the shooting/replay switching dial 14 to a shooting mode (i.e., the still-image capturing mode), the digital camera is activated in the recording mode. In response to detecting that power switch 13 is turned on and the shooting/replay switching dial 14 is set to the shooting mode, the controller 28 outputs a control signal to the motor driver 26 to move the lens barrel unit 16 to a shooting position and activate the CCD 21, the AFE unit 22, the signal processing unit 23, the SDRAM 24, the ROM 25, and LCD 19.

Then, the image-capturing lens 15 of the lens barrel unit 16 is oriented to a subject, and an image of the subject captured through the image-capturing lens 15 is formed on the photo-sensing surface of the pixels of the CCD 21. The CCD 21 outputs electrical signals (analog RGB image signal) corresponding to the image of the subject, and the A/D convertor 34 receives the electrical signals through the CDS 32 and AGC 33, converting the electrical signals into raw data.

The raw data is captured by the CCD I/F 35 of the signal processing unit 23 and is stored in the SDRAM 24 through the memory controller 36. The raw data read from the SDRAM 24 is processed and converted into a designated data format by the ISP 37. The converted data is stored in the SDRAM 24 through the memory controller 36.

The image data in a given format read from the SDRAM 24 through the memory controller 36 is transmitted to the LCD 19 through the display output controller 39, and captured images (moving images) are displayed. During the monitoring of the captured image that is being displayed on the LCD 19, one frame is read out in 1.5 seconds (sec) because the CCD I/F 35 has reduced the number of pixels of the captured image.

During this monitoring operation, although the captured images (moving images) are displayed on the LCD 19 serving as an electronic viewfinder, the release button 12 is neither pressed nor half-pressed.

As the captured images are displayed on the LCD 19, a user (a photographer) can check the composition of a still image to be captured. In some examples, the display output controller 39 outputs television (TV) video signals of captured images, and the captured images (moving images) are displayed on an external TV through a video cable.

When the release button 12 is pressed (from half-pressed to fully pressed) to start the still-image shooting operation during the monitoring operation, an autofocus (AF) operation (i.e., a focal-point detection operation) and a still-image recording process are performed.

In other words, when the release button 12 is pressed (from half-pressed to fully pressed), the focus lens 15b of the image-capturing lens 15 is driven to move in accordance with a drive signal output from the controller 28 to the motor driver 26, and, for example, an AF operation (i.e., a contrast evaluation system called a hill-climbing Af) is performed.

In the hill-climbing AF, the focus lens 15b of the image-capturing lens 15 is moved to a focal point in a direction from short distance to infinity or from infinity to short distance where the AF target range is the entire range from infinity to short distance. The controller 28 reads an AF evaluation value at each focal point (i.e., a high-pass filter output value obtained by high-pass filtering image data to extract a high-frequency component from the image data) calculated by the CCD I/F 35. Then, the focus lens 15b is moved to a target focal point where the AF evaluation value for a corresponding focal point becomes maximum, so as to achieve focus.

Further, an autoexposure (AE) process is performed, and when exposure is completed, the controller 28 outputs a drive instruction to the motor driver 26 to close the mechanical shutter unit 27, and the CCD 21 outputs an analog RGB image signal for a still image. Then, the A/D converter 34 of the AFE unit 22 converts the electrical signals into raw data in a similar manner to the monitoring time.

The ISP 37, then, converts the raw data (an image-captured signal) into an image in an intended form. The converted image is compressed into image data in, for example, JPEG format by, for example, the data compressor 40. The image data compressed into, for example, JPEG format is written back to the SDRAM 24, read from the SDRAM 24 via the memory controller 36, and stored in the memory card 43 via the media I/F 41.

In the shooting mode of the digital camera according to at least one embodiment, image processing is performed on a captured image (an input image) on a category-by-category basis. The shooting mode for performing the image processing on a captured image on a category-by-category basis is selected by operating the MENU key, the direction key, the OK key, or a certain switch of a touch panel. While that shooting mode is selected, a captured image is subjected to the image processing on a category-by-category basis at the ISP 37, and the processed captured image is recorded in the SDRAM 24 or the memory card 43 while being displayed on the LCD 19.

Next, the image processing performed on a category-by-category basis is described according to an embodiment of the present disclosure. In the image processing performed on a category-by-category basis according to an embodiment, one input image as a whole or different subjects reflected in the input image are classified into categories, and image processing is performed according to the category to generate an image as desired.

Figure 3A:
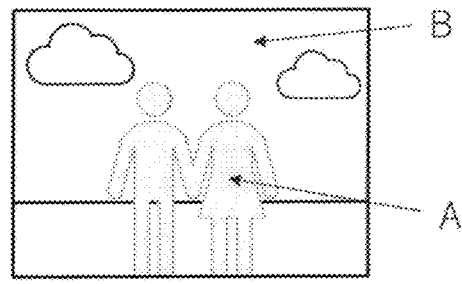
FIGS. 3A and 3B are conceptual diagrams in which one image is divided into areas to correspond to categories.
Figure 3B:
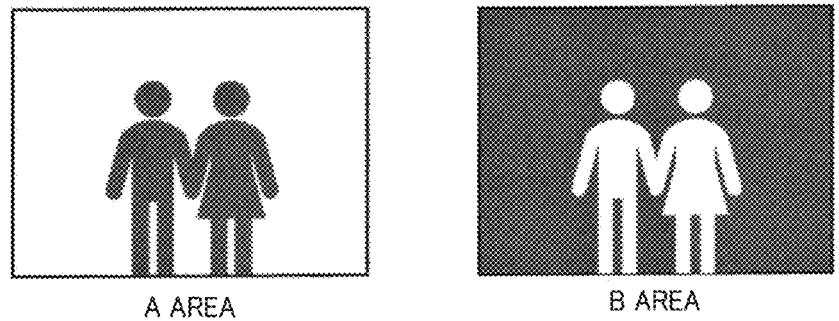

FIGS. 3A and 3B are conceptual diagrams in which one image is divided into areas to correspond to the categories.

FIG. 3A is an illustration of an example of a screen divided into two categories: one is a person area A, and the other is a background area B.

FIG. 3B is an illustration of the person area A (i.e., a shaded area) on the left and the background area B (i.e., a shaded area) on the right, which are extracted from the image of the screen in FIG. 3A.

Category analysis for determining a category or categories with respect to the entire image or the divided areas of the image employs information obtained by processes of (1) scene recognition, (2) white balance detection (i.e., identification of a light source), (3) object recognition, and (4) face detection. The information used for determining the categories is not limited such information as described above.

In the scene recognition, the category is determined with respect to a scene (e.g., a situation and a scene reflected in the input image). In this case, the entire image is subjected to the scene recognition, and it does not mean that the image is partially subjected to the scene recognition. The result of the scene recognition is used when any of the above-listed categories (2) to (4) does not apply to the divided area. The result of the scene recognition is used to select a suitable type of image processing. In the scene recognition, for example, it is determined which of the scenes including a person, a landscape, a flower, a sunbeam streaming through leaves, a dish, autumn leaves, a person with night view, a blue sky, and an evening scene was shot.

In the white balance detection (i.e., identification of light sources and acquisition of light source information), the areas recognized to belong to different categories are extracted from an input image, using the results of the white balance detection. As a result, the input image can be divided into a plurality of areas corresponding to different categories. In a white balance process, for example, a type of a light source is identified (estimated) for an input image, and according to the identified type of the light source and color information of each pixel of the input image, the input image is divided into areas, which are recognized as predetermined categories.

Figure 4:
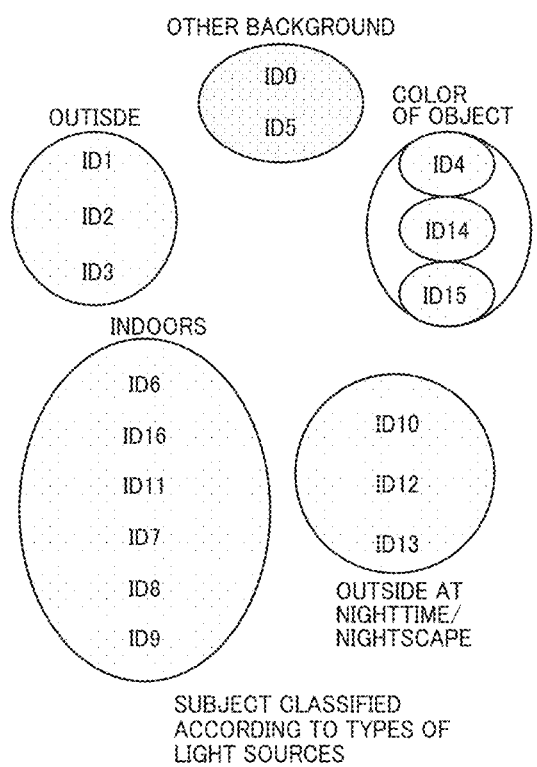
FIG. 4 is an illustration of a list of types of light sources identified by the white balance process and a list of types of subjects classified according to the type of the light source.

FIG. 4 is an illustration of the types of light sources (ID0 to ID16) identified (i.e., the light source information obtained) by the white balance process and the types of subjects classified according to the type of the light source. The following is a list of the types of light source identified by the white balance process:

ID0: etc
ID1: SUNLIGHT
ID2: CLOUDINESS
ID3: SHADE
ID4: BLUE SKY
ID5: HIGH BRIGHTNESS
ID6: INCANDESCENT LAMP
ID7: DAYLIGHT FLUORESCENT LAMP
ID8: NEUTRAL WHITE FLUORESCENT LAMP
ID9: WHITE FLUORESCENT LAMP
ID10: MAGENTA OUTDOOR LAMP
ID11: WARM WHITE FLUORESCENT LAMP
ID12: MERCURY LAMP
ID13: MERCURY LAMP GREEN
ID14: GREEN
ID15: SKIN
ID16: COMPACT FLUORESCENT LAMP In the divided areas according to at least one embodiment, areas for which different types of light sources are identified are classified into different categories.

Further, even the same subjects, which means that detected objects such as persons, dogs, or cats are the same, might be classified into different categories (divided into different areas). Each of the divided areas is categorized as a combination of the type of light source and the type of subject.

The types of light sources according to at least one embodiment include sunlight (ID1) and mercury lamp OD 12), which refer to the types of light source themselves; shade (ID3) that refers to illumination conditions; and green (ID14) and skin (ID15), which do not refer to any type of light source itself, but information regarding color tone useful for identifying a subject.

In the object recognition, for example, a machine learning method such as deep learning is used to detect objects included in the respective categories, such as a person, a dog, a cat, a bird, a bicycle, a car, a train, and an airplane, from an input image. The detection areas from which the objects have been detected in the object recognition process are used as the divided areas, and the divided areas are classified as categories, respectively.

In the face detection, a typical face detection process is used to detect a face of a person from an input image, and an area of the detected face is used as a divided area. The area is classified as a corresponding one of the categories. In some examples, a process, such as a face recognition process, may be used to identify individuals, and the identified individuals are classified into the categories. In some other examples, other types of information including age estimation and gender may be recognized, identified, and categorized, and a suitable processing parameter is selected for each of the categorized areas.

As described above, the category of the entire image or each of the divided areas corresponds to at least any one of the categories determined by the category analysis using the above-described method. Examples of the category include a person, landscape, flower, sunbeams, food, autumn leaves, night view, blue sky, evening view, indoor, outdoor, dog, cat, bird, bicycle, car, train, and airplane.

An image and each area are each classified as not only one category but also multiple categories without a contradiction within the image or each area. In such a case, a combination of these multiple categories is used as the final category. If an area is categorized as a person and a room, for example, the area is categorized as a person in the room.

Figure 5:
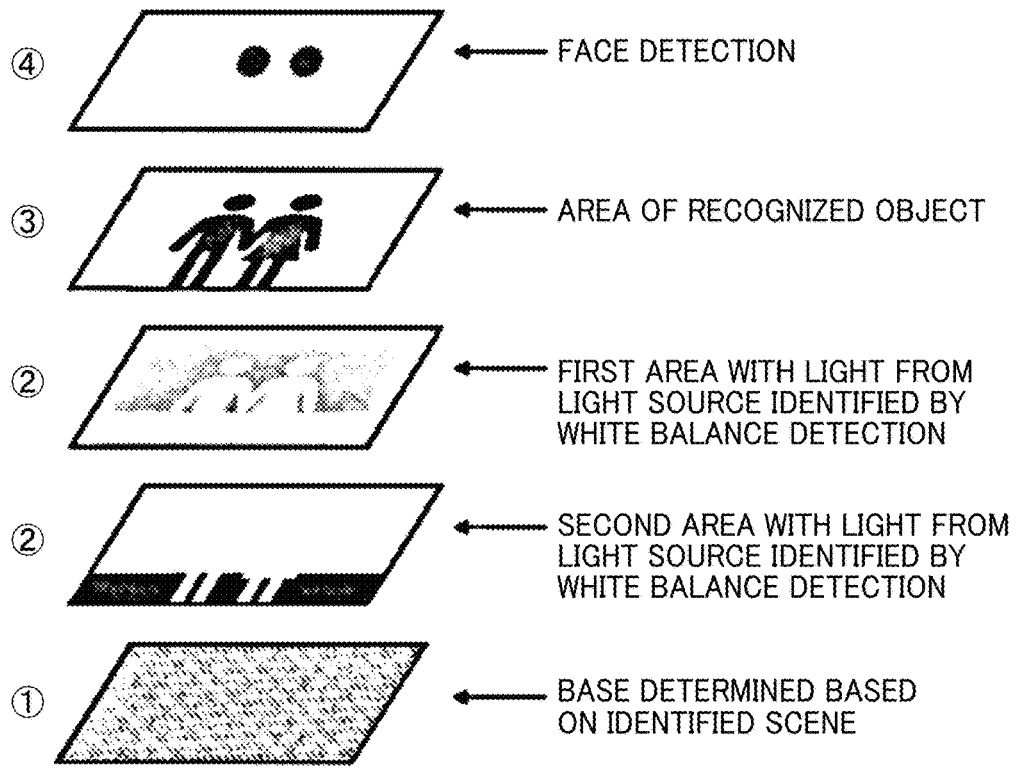
FIG. 5 is an illustration of areas divided using category analysis in which scene recognition, white balance detection (identification of a light source), object recognition, and face detection are combined.

FIG. 5 is an illustration of areas divided using the category analysis in which the above-described (1) the scene recognition, (2) the white balance detection (identification of a light source), (3) the object recognition, and (4) the face detection are combined.

Next, a process performed on an input image when the shooting mode for performing the image processing on a category-by-category basis is selected is described with reference to FIG. 6. For example, when the shooting mode for performing the image processing on a category-by-category basis is selected, the release button 12 is fully pressed, and an image is input to the signal processing unit 23 from an image sensor (i.e., the CCD 21). Upon receiving the input image at the signal processing unit 23, the ISP 37 and the CPU (i.e., the controller 28) of the signal processing unit 23 start the process of the flowchart in FIG. 6.

In step S100, the controller 28 performs the category analysis as described above on the input image (S100). In accordance with the result of the category analysis, the controller 28 divides the input image into a plurality of areas corresponding to categories in step S102 (S102).

In the processes in step S100 and step S102, when categorization of the divided areas cannot be performed by (2) the white balance detection (identification of a light source), (3) the object recognition, and (4) the face detection, instead of dividing the input image into areas, an entire image is categorized using a scene identified by (1) the scene recognition that is first performed in the category analysis. In some examples, as described above, the same area may be classified as multiple categories using the above-described processes (1) to (4).

Then, the controller 28 calculates an image processing parameter for each area of the input image in step S104 (S104), and using the calculated image processing parameter, performs image processing on the entire image or each of the divided areas in step S106 (S106). In calculating of an image processing parameter in the step S104, for example, a parameter list preset for each category (i.e., a list in which the image processing parameters are associated with the predetermined categories) may be referred to, or a parameter may be calculated for a situation of an identified category by using a predetermined algorithm or deep learning. Alternatively, a user may prepare a suitable image processing parameter for each category in advance. In addition, the image processing involves a process of changing the appearance of an image, such as tone curve, color matrix, sharpness, contrast, chroma, hue, and clearness.

When the image processing is completed on all the divided areas, the controller 28 combines theses divided areas to generate one image in step S108 (S108). In other words, the controller 28 performs, on each of the divided areas, the image processing suitable for a corresponding one of the divided areas, and combines the divided areas, on each of which the processing image has been performed, to reconstruct one image. For example, a face region of an image is subjected to a type of image processing that enables the skin to look better, and the background including tress and the sky in the image is subjected to a type of image processing that enables the green and the sky of the respective areas to stand out in the background. The images on which such types of image processing have been performed are combined to form a composite image in which each divided area of the entire image have been subjected to a suitable type of image processing. The generated combined image is recorded in a memory such as the SDRAM 24, and the process ends.

Figure 6:
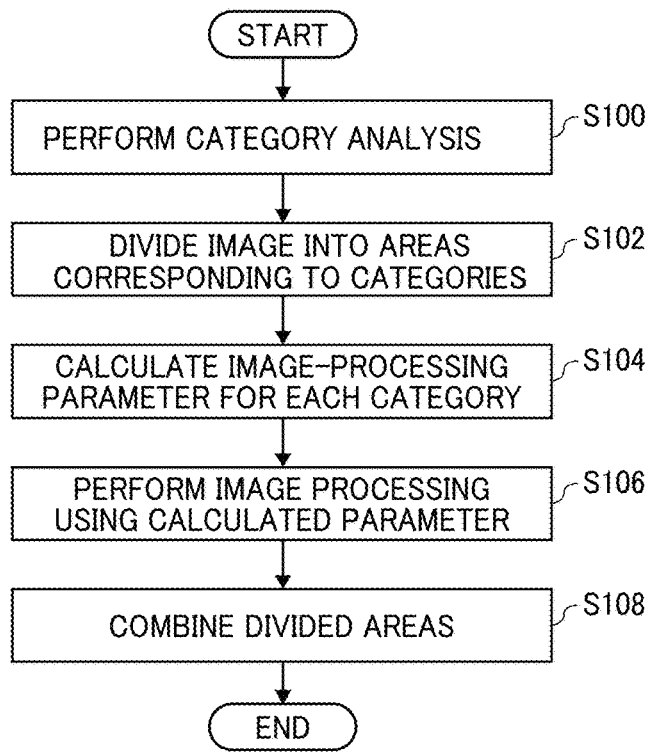
FIG. 6 is a flowchart of a process performed on an input image when a shooting mode for performing image processing on a category-by-category basis is selected.
Figure 7:
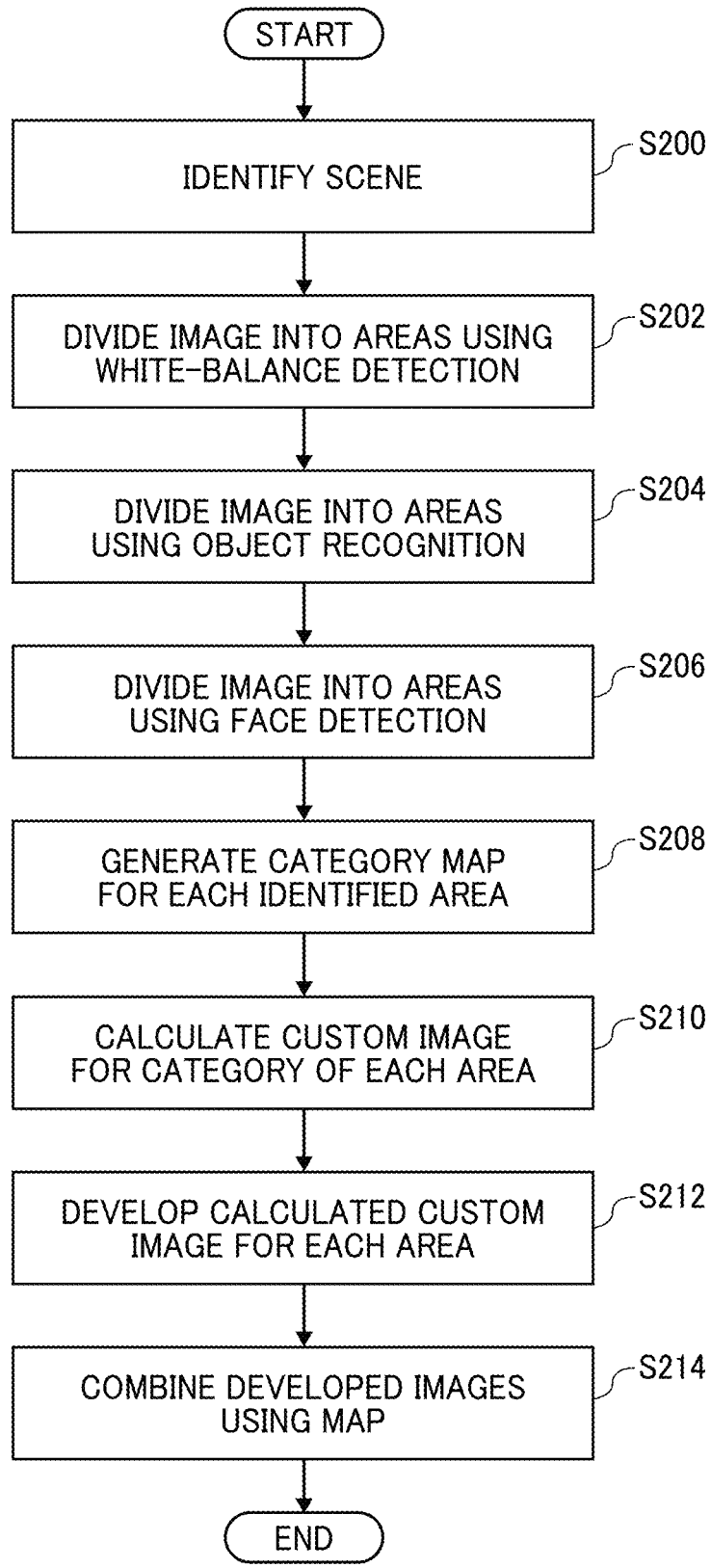
FIG. 7 is a detailed flowchart of the process in FIG. 6.

FIG. 7 is a more specific flowchart of the sequence in FIG. 6. Steps S200, S202, S204, and S206 in FIG. 7 correspond to step S100 in FIG. 6, and more specifically correspond to (1) the scene recognition, (2) the white balance detection (identification of a light source), (3) the object recognition, and (4) the face detection of the category analysis, respectively. In step S208 that corresponds to step S102 in FIG. 6, the controller 28 combines the divided areas and generate a map image in which the areas are classified into the respective categories. In step S210 that corresponds to step S104 in FIG. 6, the controller 28 calculates a custom image parameter suitable for the category of each of the divided areas. In step S212 that corresponds to step S106 in FIG. 6, the controller 28 develops an image (i.e., perform image processing) using the calculated custom image parameter. In step S214 that corresponds to step S108 in FIG. 6, the controller 28 combines the divided areas in accordance with the map image to form one image.

Figure 8:
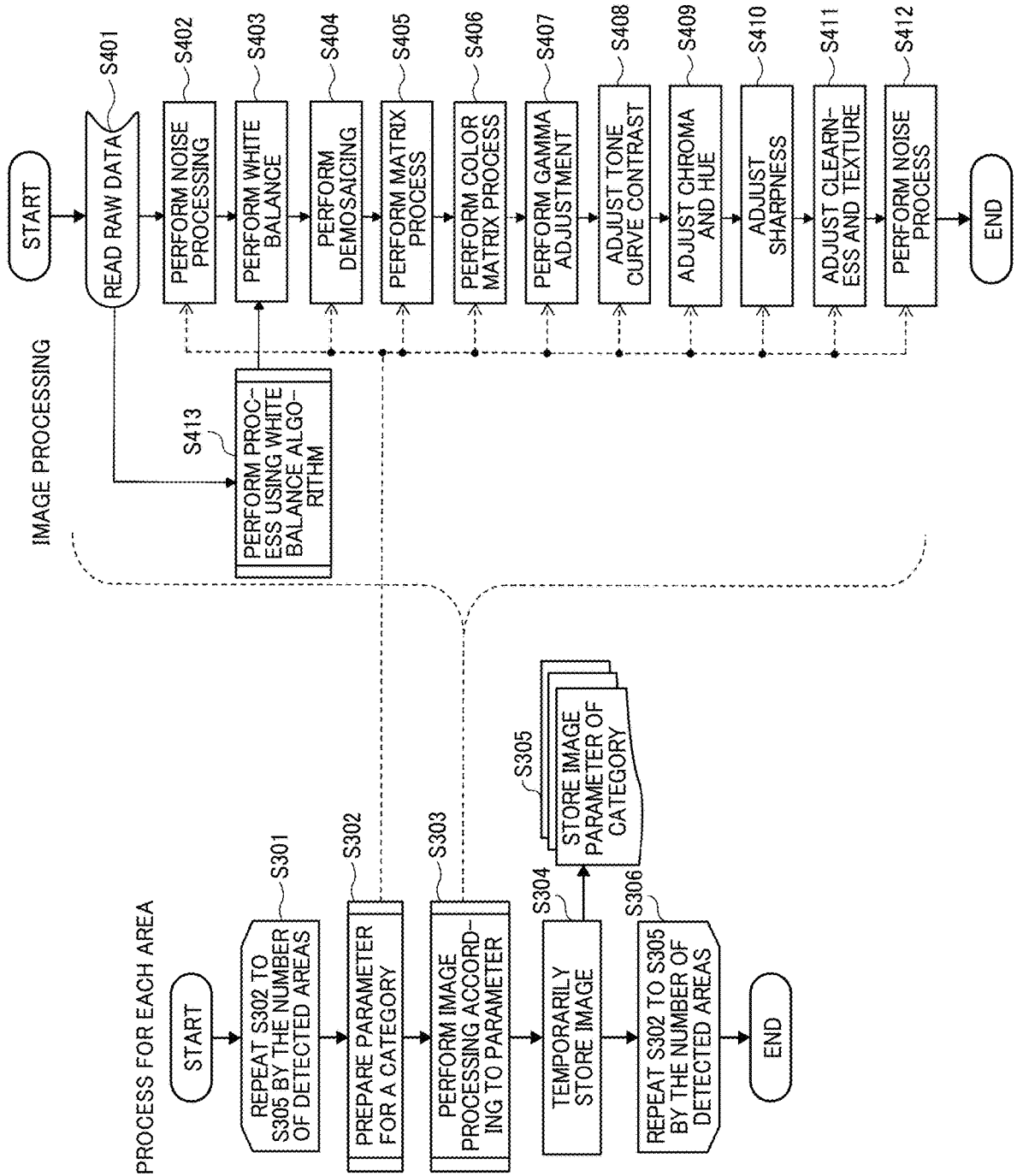
FIG. 8 is a detailed flowchart of a part of the process in FIG. 7.

FIG. 8 indicates a flow chart (on the left) of the process in step S212 of FIG. 7 for explaining in detail the entire image processing that is performed on an area-by-area basis (i.e., on a category-by-category basis) in steps S301 to S306, and another flow chart (on the right) of a detained developing process (i.e., image processing in step S303).

In the image processing performed on an area-by-area basis (i.e., the flowchart on the left of FIG. 8), parameters are prepared for the detected areas, respectively, and an image is developed by the process on the right of FIG. 8 (i.e., demosaic, matrix, and other type of image processing). In other words, in the image processing performed on an area-by-area basis, a sequence of steps S302 to S305 are repeated by the number of detected areas. In step S302, the image processing parameters for noise, white balance, demosaic, matrix, color matrix, gamma, tone curve, contrast, chroma, hue, sharpness, clearness, and texture are prepared in advance for a corresponding category of the categories of the divided areas. These parameters may be numerical values stored in the camera in advance at the time of shipment. Alternatively, a user may set a parameter for each category as long as the parameter is suitable for each category.

In step S303, the controller 28 develops (performs image processing) an image in accordance with the parameter prepared for a corresponding area (i.e., category) of the detected areas in step S302.

A specific example of the image processing is indicated as the flowchart on the right of FIG. 8. The image processed in accordance with the parameters for a corresponding area (i.e., category) of the divided areas in step S303 is temporarily stored in the memory in association with the corresponding area (category) of the detected areas in steps S304 and S305. When the developing process (i.e., the image processing) is repeated by the number of the detected areas (categories), the images processed and temporarily stored in the memory (e.g., the SDRAM 24), whose number is the number of the detected areas (categories), are combined in step S214 of FIG. 7.

Next, the developing process (i.e., the image processing) is described in detail according to an embodiment, with reference to the right flowchart of FIG. 8.

In step S401, the controller 28 reads original image data, such as raw data, that has not processed yet, from the memory. In at least one embodiment, raw data is an example of the original image data. This is only one example, and the original image data to be read from the memory may be image data in other forms other than raw data. The image data may be, for example, RGB image data, YCbCr image data, or YUV image data (YCbCr image data and YUV image data are luminance color difference signals). Further, the original image data is not limited to unprocessed image data, and may be, for example, an image (e.g., a JPEG image or a processed image) to which basic image processing is applied as long as the original data can be subjected to image processing on a category-by-category basis.

In steps S402 to S411, specific processes including noise, color, contrast, and sharpness adjustment involved in the image processing are performed.

In at least one embodiment, the controller 28 performs a noise process on raw data in step S402 (S402), a white balance process on raw data in step S403 (S403), and demosaicing on raw data in step S404 (S404). Further, the controller 28 performs a matrix processing on RGB data in step S405 (S405), a color matrix process on RGB data in step S406 (S406), and a gamma adjustment on RGB data in step S407 (S407). Still further, the controller 28 adjusts tone curve and contrast of RGB data in step S408 (S408), chroma and hue of YCC data in step S409 (S409), and sharpness of YCC data in step S410 (S410). Yet further, the controller 28 adjusts clearness and texture of YCC data in step S411 (S411), and performs noise process on YCC data in step S412 (S412).

Note that these processes of S402 to S412 may be in any suitable order according to the situation. Moreover, any of the processes of S402 to S412 may be omitted where unnecessary.

In addition, the image data to be processed may be in any suitable format for the purpose, and some sets of image data to be subjected to the same type of image processing may be in different formats according to the purpose (for example, the image data to be subjected to the noise processing in S402 and the image data to be subjected to the noise processing in S412 may be in different formats).

Figure 9:
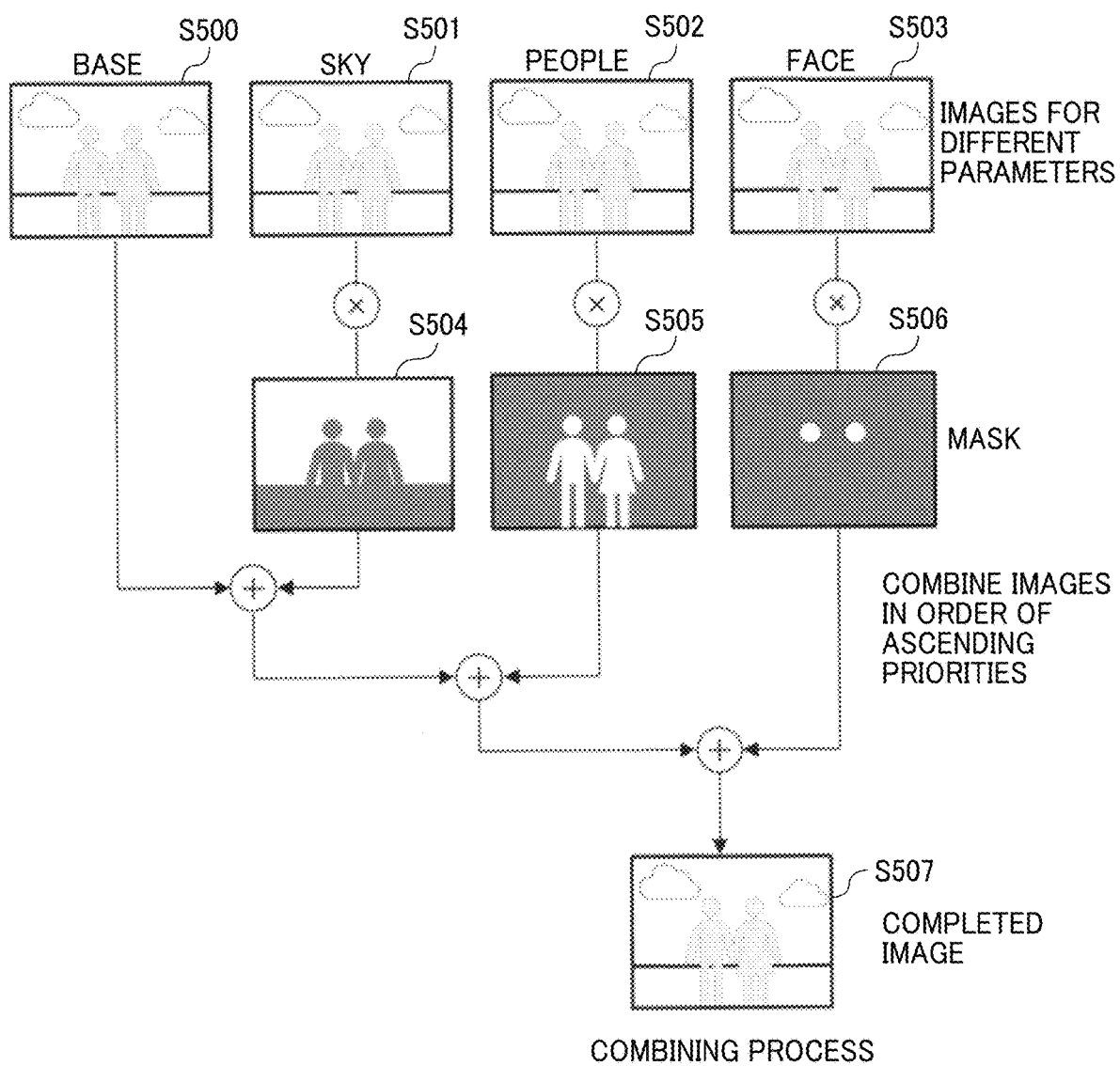
FIG. 9 is an illustration of a processing of combining images for each category.

FIG. 9 is an illustration of the flow of a combining process in step S214 of FIG. 7. In the example of FIG. 9, S500 to S503 indicate images processed using parameters corresponding to the detected areas (categories), respectively in step S303 of FIG. 8 and temporarily stored in association with the detected areas (categories), respectively in the memory in steps S304 and S305 of FIG. 8.

More specifically, in the example of FIG. 9, S500 indicates a base image, S501 indicates an image corresponding to an area categorized as "sky", S502 indicates an image corresponding to an area categorized as "person (people)", and S503 indicates an image corresponding to an area categorized as "face".

In the combining process in step S214 of FIG. 7 according to an embodiment, the controller 28 generates masks S504, S505, and S506 corresponding to the respective categorized areas, and combines the generated masks S504, S505, and S506 with the images S501, S502, and S503, respectively to extract the categorized areas from the images.

In the example of FIG. 9, the images corresponding to the respective areas are combined with the base image S500 in that recited order so as to generate a completed image (final image) S507.

In the combining process according to an embodiment, images are combined in order of ascending priority so as to consequently give precedence to the image processing corresponding to an area of highest priority. By doing so, when the categories are the same between images, an image to which the image processing of a higher priority is applied is generated. In some examples, weights may be assigned to the masks to be combined, and the images may be combined to enables a natural-looking of an image at the edge.

In the above description, the example of the combining process using masks is given. In some examples, without using masks, an entire image is divided into tiny blocks, and a combining process is performed on each block. In some other examples, tiled areas are subjected to the respective combining processes. In short, the embodiments of the present disclosure are not limited to the combining method using a mask, and any combining method that extracts areas corresponding to the respective categories and combines the areas is applicable.

As described above, according to an embodiment of the present disclosure, a captured image is divided into areas as categories, and image processing is performed on each of the divided areas of categories using a different image-processing parameter. The processed images are combined to form one image with successful color reproduction in each of the divided areas.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An image processing apparatus comprising:
processing circuitry configured to:
divide an input image into a plurality of areas to correspond to predetermined categories, using information of the input image;
set different image processing parameters for the plurality of divided areas corresponding to the predetermined categories, respectively;
perform image processing on the plurality of divided areas using the different image processing parameters corresponding to the plurality of divided areas; and
combine the plurality of divided areas on which the image processing has been performed to form an image.

2. The image processing apparatus according to claim 1, wherein the processing circuitry is configured to divide the input image into the plurality of divided areas using one or more of a white balance process, an object recognition process, a face detection process, and a scene recognition process.

3. The image processing apparatus according to claim 1, wherein each of the different image processing parameters corresponds to one or more of processes of color matrix, gamma, tone curve, contrast, chroma, hue, clearness, sharpness, noise, and texture.

4. The image processing apparatus according to claim 1, wherein the processing circuitry is configured to set the different image processing parameters by referring to a list in which the different image processing parameters are associated with the predetermined categories.

5. The image processing apparatus according to claim 1, wherein the processing circuitry is configured to set the different image processing parameters in accordance with an algorithm.

6. The image processing apparatus according to claim 1, wherein the processing circuitry is configured to set the different image processing parameters to correspond to values for the predetermined categories, respectively, set by a user.

7. An image processing method comprising:
dividing an input image into a plurality of areas to correspond to predetermined categories, using information of the input image;
setting different image processing parameters for the plurality of divided areas corresponding to the predetermined categories;
performing image processing on the plurality of divided areas using the different image processing parameters corresponding to the plurality of divided areas; and
combining the plurality of divided areas on which the image processing has been performed to form an image.

8. The image processing method according to claim 7, wherein the dividing the input image into the plurality of areas involves one or more of a white balance process, an object recognition process, a face detection process, and a scene recognition process.

9. The image processing method according to claim 7, wherein each of the different image processing parameters corresponds to one or more of processes of color matrix, gamma, tone curve, contrast, chroma, hue, clearness, sharpness, noise, and texture.

10. The image processing method according to claim 7, wherein the setting the different image processing parameters involves referring to a list in which the different image processing parameters are associated with the predetermined categories.

11. The image processing method according to claim 7, wherein the setting the different image processing parameters is performed in accordance with an algorithm.

12. The image processing method according to claim 7, wherein the setting the different image processing parameters is performed to correspond to values for the predetermined categories, respectively, set by a user.

* * * * *